United States Patent
Zeng

(12) 
(10) Patent No.: US 6,373,974 B2
(45) Date of Patent: *Apr. 16, 2002

(54) METHOD FOR EXTRACTING MULTIRESOLUTION WATERMARK IMAGES TO DETERMINE RIGHTFUL OWNERSHIP

(75) Inventor: Wenjun Zeng, Vancouver, WA (US)

(73) Assignee: Sharp Laboratories of America, Inc., Camas, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,231

(22) Filed: Sep. 30, 1998

Related U.S. Application Data

(60) Provisional application No. 60/078,224, filed on Mar. 16, 1998.

(51) Int. Cl.[7] .................................................. G06K 9/00
(52) U.S. Cl. ........................................ 382/135; 382/100
(58) Field of Search ................................. 382/135, 232, 382/100; 380/4; 209/534; 235/379; 250/200; 356/71; 902/7

(56) References Cited

U.S. PATENT DOCUMENTS

| | | | |
|---|---|---|---|
| 5,636,292 A | 6/1997 | Rhoads ........................ | 382/232 |
| 5,659,726 A | 8/1997 | Sanford, II. et al. ........ | 707/101 |
| 5,687,236 A | 11/1997 | Moskowitz et al. .......... | 380/28 |
| 5,862,260 A | * 11/1999 | Rhoads ........................ | 382/232 |
| 5,982,891 A | * 11/1999 | Ginter et al. .................. | 380/4 |

* cited by examiner

*Primary Examiner*—Leo Boudreau
*Assistant Examiner*—M B Choobin
(74) *Attorney, Agent, or Firm*—Robert D. Varitz, PC

(57) ABSTRACT

A method for embedding and extracting visually imperceptible indicia in an image includes embedding a visually imperceptible indicia in an original image; testing a test image for an embedded visually imperceptible indica; and extracting the visually imperceptible indicia from the test image to determine if the test image is a copy of the original image.

17 Claims, 5 Drawing Sheets

Fig. 1a
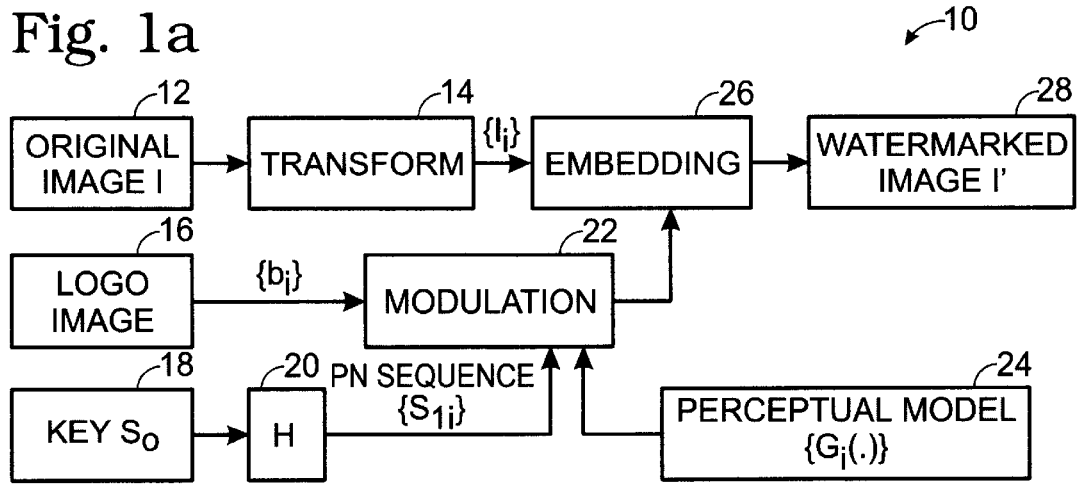
Fig. 1b
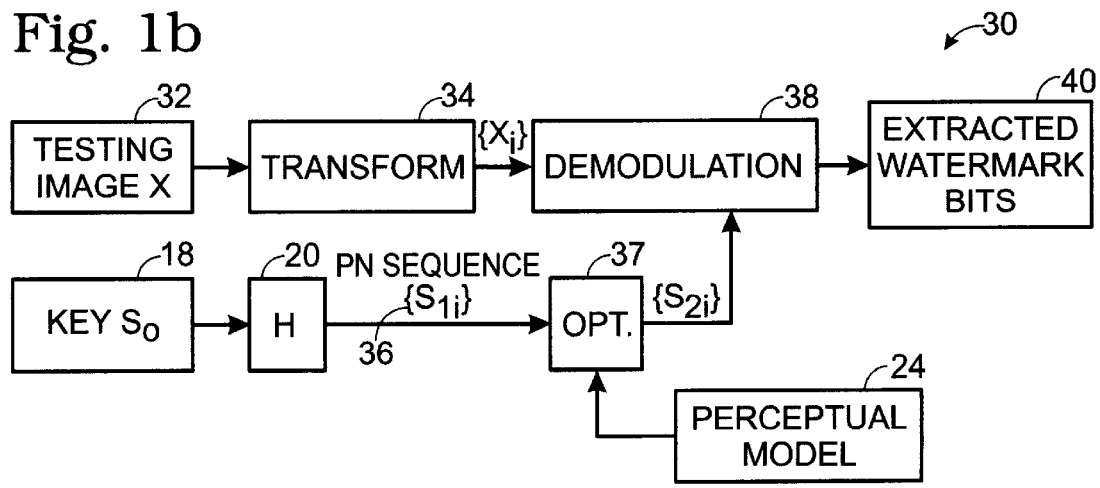
Fig. 2a
Fig. 2b
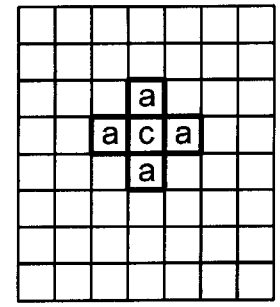
Fig. 2c

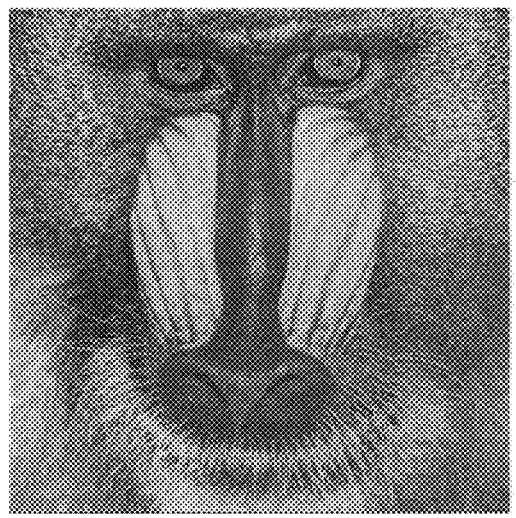
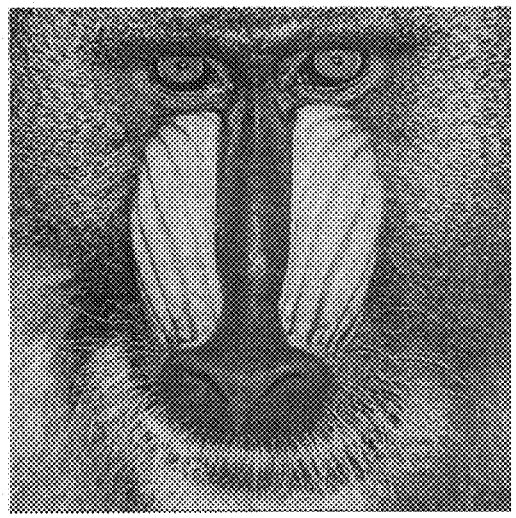
Fig. 3a Fig. 3b
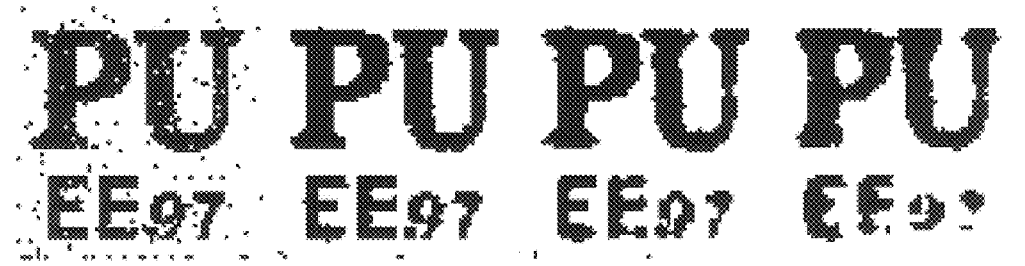
Fig. 4a Fig. 4b Fig. 4c Fig. 4d

METHOD FOR EXTRACTING MULTIRESOLUTION WATERMARK IMAGES TO DETERMINE RIGHTFUL OWNERSHIP

This application claims benefit of Provisional Application Ser. No. 60/078,224 filed Mar. 16, 1998.

FIELD OF THE INVENTION

This invention relates to digital watermarking of multimedia data for copyright protection.

BACKGROUND OF THE INVENTION

Digital watermarking is a process of embedding information, sometimes referred to as a signature, directly into the media data by making small modifications to the data. The subsequent extraction of the signature from the watermarked media data may be used to identify the rightful owner, the intended recipients, and the authenticity of a media data. Because of the rapid growth of digital imagery, the increasingly easy access to digital media, and the availability of powerful digital image manipulation tools, media security has become an important issue. Digital watermarks have been proposed as a method for indicating copyright ownership of multimedia data.

There are two requirements for invisible watermarks: First, the watermarks should be perceptually invisible, i.e., they should not interfere with the media being protected; Second, the watermark should be sufficiently robust to defeat any attempt to eliminate the watermark, or to forge a fake watermark to establish a counterfeit ownership claim. They should also be sufficiently robust to withstand common signal processing. Particularly, a watermark should be detectable even if common signal processing operations have been applied to the watermarked image.

Early developments in digital watermarking concentrated on the first objective without considering the second, resulting in "invisible" watermarks which are easily circumvented. Recently, work has been devoted to designing robust watermarking schemes. Perceptual models have been incorporated to equalize watermark qualities of perceptual invisibility and robustness to signal processing. In some applications, it may be advantageous to exploit the human visual system's superior ability to recognize a correlated pattern. However, in the prior art, instead of directly extracting a watermark image, the superior recognition ability of the human visual system is only used to visualize some detection results.

Previous methods suffer from one or some of the following drawbacks. They are not generally robust to signal processing The watermarks are embedded to the visually least significant portion of an image. While this approach results in watermarked images with very good visual quality, the embedded watermark is generally vulnerable to signal processing, such as JPEG compression, lowpass filtering etc.

The original un-watermarked image is needed in the detection process. Some previous methods use the original un-watermarked image in the watermark detection process. Typically the watermark sequence may be first extracted by subtracting the original image data from the test (potentially watermarked) image data. While this generally increases the detection capability of the watermarking system, and is helpful for some applications, such as identifying an illegal distributor, it is not applicable to resolving rightful ownership claim. This is because the authenticity of the claimed "original" image is still questionable. An attacker may forge a fake "original" image and a fake watermark and come up with a counterfeit ownership claim. Requiring the watermark to be dependent on the "original" image in the hope that with this constraint the "original" image may not be generated after the fake watermarks does not necessarily resolve this problem, because an attacker still has the flexibility to manipulate the claimed "original" image to computationally search for an original-image-dependent fake watermark, which has certain correlation with the extracted watermarks.

The detector output is not immediately obvious to a jury. Some schemes embed some potentially registered numbers such as an owner ID, or image ID, similar to the ISBN # of a book. The physical meaning of the extracted bits has to be conveyed by an interpreter such as a central registration agent, or a technical expert in the court, which may not be straightforward to a jury. In addition, the number of bits that may be embedded and later reliably extracted depends on how severely the watermarked image has been processed. One has to determine the tradeoff between number of bits embedded and the robustness of the watermark to signal processing at the time of watermark insertion. A one bit error in the extracted bits may cause the whole ID number to be invalid. Some methods are known which embed a binary image, and hence are easier for a jury to understand, however, such techniques still have to use the original image in the watermark extraction process, thus are not applicable to resolving rightful ownership as discussed above. Furthermore, such methods do not allow the watermark detector to adaptively choose the tradeoff between the degree of robustness and the resolution of the extracted watermark

SUMMARY OF THE INVENTION

In this invention, a method to "visualize", in an adaptive manner, the invisible watermarks for proving the ownership is described. A method which is capable of embedding a good resolution meaningful binary watermark image in an image and later extracting different versions of that watermark image with varying resolutions is proposed. The method has the nice feature that the watermark detector is allowed to adaptively choose the trade-off between robustness degree and resolution of the extracted watermark image.

A meaningful binary watermark image is embedded and extracted, which will greatly facilitate the process of convincing a jury of an ownership claim. While a statistical technique which may quantify the false alarm detection probability should be considered as a fundamental measure for a valid ownership claim, the ability to extract a meaningful watermark image, i.e., a logo, a registration number, or an image recognizable by a lay person, will greatly facilitate the process of convincing a jury of an ownership claim. A jury usually consists of nontechnical people. The presentation of an extracted meaningful watermark image is much more convincing than a numerical value.

A method for embedding and extracting visually imperceptible indicia in an image includes embedding a visually imperceptible indicia in an original image; testing a test image for an embedded visually imperceptible indica; and extracting the visually imperceptible indicia from the test image to determine if the test image is a copy of the original image. The method may also include examining segments of varying sizes in the image at the decoder for detecting each bit of the embedded signature, and allows a user of the method of the invention to select trade-offs between resolution and detection performance, and to select an overall level of performance.

An object of the invention is to provide a valid, robust watermarking method which will facilitate the process of convincing a jury of an ownership claim.

BRIEF DESCRIPTION OF THE DRAWINGS

FIG. 1a is a block diagram for the watermark encoder used in the method of the invention.

FIG. 1b is a block diagram for the watermark detector used in the method of the invention.

FIG. 2a depicts a 64×64 binary watermark image to be embedded.

FIG. 2b depicts the extracted binary image when the test image does not contain the embedded watermark.

FIG. 2c depicts a current image segment and surrounding segment.

FIG. 3a depicts an original 512×512 "Baboon" image.

FIG. 3b depicts a watermarked "Baboon" image.

FIG. 4 depicts extracted watermark images from 512×512 watermarked "Baboon".

DETAILED DESCRIPTION OF THE PREFERRED EMBODIMENT

Figure 5A:
FIG. 5a depicts an original 512×512 "Lenna" image.
Figure 5B:
FIG. 5b depicts a watermarked "Lenna" image.

The method of the invention provides an opportunity to exploit the human visual system's (HVS) superior ability to recognize a correlated pattern. In this invention, a watermark decoder is allowed to directly extract a meaningful binary watermark image from the test image to prove image ownership. The human visual system's superior recognition ability is exploited to provide persuasive evidence of copyright ownership to a jury. The method is robust and will withstand common forms of signal processing. As used herein, "robust" means that there is a possibility of correct detection of each bit following signal processing, therefore, a more robust embedding/detection scheme has a higher probability that each bit will be correctly detected following signal processing.

The method allows extraction of multiresolution watermark images. Images may absorb various amount of watermark implantation without revealing visual artifacts. More importantly, the watermarked image may undergo different types of signal processing before it is input as the test image to the watermark detector. The watermarks may be treated as a signal to be transmitted, and the original image may be considered a transmission media. However, the channel capacity is variable, depending on the original image characteristics, and on the amount of signal processing applied to the watermarked image. Because channel capacity is unknown at the time of watermark insertion, it is difficult to determine how much information may be embedded and later reliably extracted at the watermark detector.

To survive the most severe channel conditions, i.e., noisy signal conditions, the embedded data rate should be low, therefore less information may be embedded. However, tailoring to the "worst case" is not desirable, because when the channel condition is good, the possibility of extracting more information to more effectively convincing a jury is sacrificed. In this approach, a good resolution binary watermark image is always embedded. However, the watermark detector has the flexibility of extracting watermark images at different resolutions. In other words, the detector has the capability to adapt to the channel conditions. When the channel condition is good, the detector extracts and present a good resolution watermark image, which definitely will convince a jury of a valid ownership claim. On the other hand, when the channel condition is bad, the detector may still be able to extract a coarse resolution watermark image, which hopefully will also convince a jury.

The method of the invention, which is capable of embedding a good resolution meaningful binary watermark image, one that will make sense to a jury, e.g. a logo image, in an image, and is later capable of extracting different versions of that watermark image with varying resolutions, is disclosed. The method of the invention adaptively chooses the trade-off between robustness and resolution of the extracted watermark image. While a statistical technique which may quantify the false alarm detection probability should be considered as a fundamental measure for a valid ownership claim, the ability to extract a meaningful watermark image will greatly facilitate the process of convincing a jury of an ownership claim.

FIG. 1a depicts the general architecture of a watermark encoder, generally at 10, using the method of the invention. An original image I, 12, is selected for watermarking. Image 12 may be transformed, in the preferred embodiment, step 14, into a transformed image having a set of features, $I_i$, in preparation for watermark embedding. Step 14, however, is not always required. A logo image $\{b_i\}$ 16, may be designated and prepared for embedding. A meaningful signature, or key, $S_0$, 18, (e.g. an owner name or ID) is first mapped, using a one-way deterministic function H 20, to a single parameter which is then used as a seed of a standard random number generator to generate an independent identical distribution (i.i.d.) pseudo random sequence $S_1$, denoted as $\{S_{1i}\}$, which defines each point in the sequence. The requirement that the seed of the random number generator is derived from a meaningful signature or registration number, $S_0$, eliminates the possibility of forging a watermark by manipulating the seed to search for a large detector output value, which indicates a low false alarm detection probability, as will be shown later herein.

Logo image 16 and key 18 are also referred to herein, collectively, as a visually imperceptible indicia, or watermark. Logo image 16 may be an actual logo, or other identifying indicia, selected by the copyright owner, that will be meaningful to a jury, i.e., a jury will immediately recognize logo image 16 as something that belongs to the copyright owner. Key 18 is generally an alpha-numeric, a registration number, such as an ISDN or copyright registration number. It is assumed that key 18 will always be used as the visually imperceptible indicia, while logo image 16 is an optional indicator of ownership.

The logo image 16 is modulated, step 22, with $S_{1i}$, and, with perceptual model 24, which controls the magnitude of $G_i(I_i)$, is inserted, step 26, into $I_i$, forming a watermarked image I'. The meaningful signature is, in the preferred embodiment, a 64×64 bit block, which, when projected on and inserted into a 512×512 image block provides one bit in every 8×8 block of the original image.

Note that if there is no constraint on the procedure for generating the seed of the random number generator, then an attacker can, by varying the seeds, thoroughly search for a random sequence that has good correlation with any given image. For example, given any test image, by varying the seed, on average, after $10^7$ trials, the detector will output a value which is larger than 5 (see Table 1). Then the attacker may then assert that the test image contains his resulting seed.

Discussing first a scenario in which a claimed signature is to be detected using a quantitative measure, first assume that the logo image bits, $\{b_i\}$ 16, of FIG. 1a, are all "1". The following describes how to detect the claimed signature $S_0$, if the signature is embedded in the test image.

Given a set of features $\{I_i\}$, derived from the original image I, the signature $S_{1i}$ is modulated by $G_i(I_i)$, where $G_i(.)$ could be a function of $I_i$, and then added to $I_i$. The encoding function E is illustrated in Eq. (1).

In the watermark detector, shown generally at 30 in FIG. 1b, the test image 32, X, is transformed, step 34, to yield a feature set $\{X_i\}$. The random sequence $\{S_{1i}\}$ is first developed by subjecting $S_0$ to H. Then a correlating signature $\{S_{2i}\}$ is generated based on $\{S_{1i}\}$ and the perceptual model 24. $X_i$ is demodulated by $S_{2i}$, under the control of perceptual model 24, to yield extracted watermarked bits 40, if present. $S_{2i}$ may be optimized, block 37, to improve detector performance. The correlator output q is compared to a threshold T to determine if the test image is a watermarked one. Detection of the watermarks is accomplished via the hypothesis testing:

$H_0$: $X_i=I_i+N_i$ not watermarked (0)

$H_1$: $X_i=I_i+G_i(I_i)S_{1i}+N_i$ watermarked (1)

where $N_i$ is noise, possibly resulted from some signal processing such as JPEG compression, etc. The correlating detector outputs the test statistic q $$q = \frac{\sum_{i=1}^{n} Y_i}{V_y n^{1/2}} = \frac{M_y n^{1/2}}{V_y} \quad (2)$$

where $Y_i=X_iS_{2i}$, n is the size of the feature set $\{X_i\}$, $M_y$ is the sample mean of $Y_i$, and $V_y^2$ is the sample variance of $Y_i$.

$$V_y^2 = \frac{\sum_{i=1}^{n}(Y_i M_y)^2}{n-1} \quad (3)$$

$$M_y = \frac{\sum_{i=1}^{n} Y_i}{n} \quad (4)$$

Assume that the sequence $\{Y_i\}$ is stationary and at least 1-dependent (A sequence $\{Y_i\}$ is 1-dependent if $(Y_1, \ldots, Y_k)$ and $(Y_{k+n}, \ldots, Y_{k+n+m})$ are independent whenever n>1), and that $\{S_{2i}\}$ is zero mean and un-correlated with the original image I. Then under $H_0$, for large n, q is approximately a normal distribution with zero mean and unit variance, i.e., q~N(0, 1).

Let E(.) denote the expectation operator. Under Hypothesis $H_1$ and for large n, it is easy to show that q follows a normal distribution N(m, 1), where $$m = \frac{\sum_{i=1}^{n}(G_i(I_i)S_{1i}S_{2i} + N_i S_{2i})}{V_y n^{1/2}}$$

$$= \frac{(E(G_i(I_i)S_{1i}S_{2i}) + E(N_i S_{2i}))n^{1/2}}{V_y} \quad (5)$$

Note that $E(N_i S_{2i})$ may not be equal to zero, since $N_i$ could have some correlation with $S_{2i}$. For example, if the feature points are some DCT coefficients, then the noise introduced by zeroing out some of the coefficients (due to, e.g., coarse quantization) is highly correlated with $S_{1i}$, and thus may potentially have high correlation with $S_{2i}$.

To determine if a test image contains the claimed watermarks, the output q is compared to a threshold T. If q>T, the test image is declared to have been signed with the claimed signature $\{S_{1i}\}$. Otherwise it is not. The threshold T that minimizes the total detection error (both Type 1 error—accept the existence of a signature under $H_0$, and Type 2 error—reject the existence of a signature under H1) is T=m/2. In practice, however, nobody other than the true owner knows the value of m. People may only care about the false alarm detection probability, that is, the probability of error detection by accepting the existence of a signature when it does not exist. Table 1 depicts the false alarm detection probability as a function of the threshold T.

TABLE 1

| False alarm detection probability $P_{err}$ for the watermarking method presented | |
|---|---|
| Threshold T | $P_{err}(q > T)$ |
| 3 | 0.0013 |
| 5 | 2.86E-7 |
| 6 | 9.86E-10 |
| 8 | 6.22E-16 |
| 10 | 7.62E-24 |
| 12 | 1.77E-33 |

For a valid ownership claim, a valid correlating signature $S_2$ should satisfy certain constraints. First, it should be un-correlated with the original image I. Second, it is necessary that the mean value of $S_{2i}$ be zero. If $G_i(.)$ is independent of $I_i$, then the choice of $S_{2i}=G_i S_{1i}$ is the optimal correlating signature which will result in the largest mean value m under $H_1$. On the other hand, if $G_i(.)$ is a function of $I_i$, and assuming that $G_i(.)$ may be written as a product of two terms, i.e., $G_i(I_i)=U_i(I_i)W_i$ where $W_i$ is independent of $I_i$, then a good choice of $S_{2i}$ is $S_{1i} W_i$.

It should be noted that setting $S_{2i}$ to $G_i(I_i)S_{1i}$ is generally not a good choice. In fact, $\{G_i(I_i)S_{1i}\}$ is not a valid correlating signature, because it depends on the original image I. Details of the analysis of selecting $S_{2i}$ may be found in W. Zeng and B. Liu, "An invisible watermark detection technique without using original images for resolving rightful ownership of digital images," submitted to IEEE Tran. Image Processing, August 1997.

The scheme described above makes any counterfeit scheme virtually impossible, and the watermark detector output value truly quantifies the false alarm detection probability. However, the physical meaning of the detector output value may not be understood by a jury without the aid of expert testimony. In addition to the detector output value, which quantifies the false alarm detection probability, one may extract a meaningful watermark image (e.g., a logo image) from the test image, it will greatly facilitate the process of convincing a jury of an ownership claim.

Extraction of Multiresolution Binary Watermark Images

The scheme presented above essentially extracts one bit information from the entire test image X, i.e., whether the claimed signature 18 ($S_0$) is embedded in the test image or not. One may embed/extract more bits by segmenting the whole image into smaller segments, that may or may not overlap, and then embed/extract one bit for each segment. A segment may be defined as a collection of data located in various parts of the image. Once the pseudo random sequence $S_1$ is generated and divided into smaller segments, each of which corresponds to one segment of the original feature set $\{I_i\}$, each segment of $S_1$ may be modulated by either +1 or −1, which is then embedded into the corresponding segment of $\{I_i\}$. Detection of this one bit information for a particular segment is accomplished via the hypothesis testing:

$$H_0': X_i=I_i+G_i(I_i)S_{1i}+N_i \text{ a bit of +1 is embedded} \quad (6)$$

$$H_1': X_i=I_i-G_i(I_i)S_{1i}+N_i \text{ a bit of −1 is embedded} \quad (7)$$

where $N_i$ is noise, and index i corresponds to data in one particular segment. Using the test statistic q as shown in Eq. (2), and assuming that $\{S_{2i}\}$ is zero mean and un-correlated with the original image I, q follows normal distribution N(m, 1) and N(−m, 1) for $H_0'$ and $H_1'$ respectively, with m defined in Eq. 5. Therefore, the threshold that minimizes the total detection error is T=0. In other words, when q (or equivalently $\Sigma_{i=1}^{n} X_i S_{2i}$) is greater than 0, a bit +1 is extracted; otherwise, a bit −1 is extracted. To minimize the detection errors, $S_2$ is selected to maximize m. If $G_i(.)$ is independent of $I_i$, then the optimal choice of $S_{2i}$ is $G_i S_{1i}$. On the other hand, if $G_i(.)$ is a function of $I_i$, and assuming that $G_i(.)$ may be written as a product of two terms, i.e., $G_i(I_i)=U_i(I_i) W_i$, where $W_i$ is independent of $I_i$, then $S_{1i} W_i$ is a good choice for $S_{2i}$. Again, setting $S_{2i}$ to $G_i(I_i) S_{1i}$ is generally not a good choice.

To be most effective, the method should embed a meaningful binary watermark image. While a large detector output value, which quantifies the false alarm detection probability, should be considered as the fundamental measure for a valid ownership claim, the ability to extract a meaningful watermark image is very useful in convincing a jury of the claim of ownership. The extracted watermark image serves as a visual measure of the "invisible" watermarks embedded in the test image. It has an additional advantage of exploiting the human visual system's superior ability to recognize a correlated pattern. It is well known that, unlike traditional data, visual data may be "lossy", and less sensitive to detection errors. Human eyes easily filter out random noise and recognize a correlated pattern, in a way similar to how channel coding detects and corrects transmission errors. Another advantage is that visual data usually has high spatial correlation. This property may be used to enhance the detection performance, and will now be described.

It may be seen from Eq. (5) that the larger the size, n, of each segment, the larger the value of m, and hence the smaller the detection error. However, increasing the size of each segment reduces the total number of bits that may be embedded. As a result, the prospective binary watermark image to be embedded has more constraints and less flexibility. Instead of enlarging the segment, the method of the invention embeds one bit to each small, say, 8×8, image block.

At the detector, one may usually correctly extract one bit from each 8×8 test image block, if the watermarked image does not suffer from much image processing. However, if the watermarked image does undergo some image processing, the bit will not be extracted reliably It and the detection error will increase. In this case, the method exploits the spatial correlation of the binary watermark image to improve detection performance.

Referring now to FIG. 2c, the number of image segments from which one bit will be extracted is increased by looking also at surrounding, or adjacent, segments, a, rather than just the current segment, c. Note again at the encoder, each watermark bit is embedded in a small block such as an 8×8 block, and at the decoder the image is still first segmented into 8×8 blocks. However, at the decoder, the segments associated with neighboring bits, a, are used to detect the current bit. For example, to extract the bit embedded in the current 8×8 image block, c, the surrounding image blocks, a, may also be used. In other words, calculate $\Sigma_{i=1}^{n'} X_i S_{2i}$, where n' is the total number of features within the detection window, and then compare the result to zero to determine the embedded bit of the current block. Note that if the test image X does contain the watermark image, then $$\Sigma_{i=1}^{n'} X_i S_{2i} = \Sigma_{i=1}^{n'} (I_i+N_i)S_{2i} + \Sigma_{i=1}^{n'} b_i G_i(I_i) S_{1i} S_{2i},$$

where $b_i$ is the corresponding bit (+1/−1) embedded in a particular 8×8 block. The second term accumulates and is the major factor to determine the embedded bit. A bit in a homogenous region of the watermark image usually has the same value as the surrounding bits. Thus by increasing the number of neighboring blocks involved in extracting one bit information embedded in the current block, $|\Sigma_{i=1}^{n'} b_i G_i(I_i) S_{1i} S_{2i}|$ is increased, thus reducing the detection error. However, for information bits around an edge in the binary watermark image, increasing the window size may not necessarily reduce the detection error, because the $b_i$ embedded in other blocks may not have the same sign as the $b_i$ embedded in the current block. Therefore the extracted binary watermark image may lose its resolution around edges, even though it is more robust to signal processing in the homogenous region. The trade-off here is robustness of detection of each bit vs. resolution of extracted watermark image. An important feature of the method of the invention is that the watermark detector is allowed to adaptively choose the trade-off between robustness and resolution. The use of a larger number of segments for detection of a single, or current, bit tends to eliminate noise and increase robustness, except at the edges of the image.

When the test image does not suffer from signal processing, a small detection window. i.e., a relatively small number of segments, generally having 8×8 or more bits per segment, is chosen and a good resolution watermark image will be extracted. On the other hand, when the test image suffers from severe image processing, robustness is a concern and the number of segments involved for detecting each bit should be increased. In this case, by increasing the detection window size, a coarse resolution watermark image may be extracted. It should be noted that increasing the detection window size to increase the robustness is different from applying some noise-reduction operations, such as media filtering, to the extracted watermark image obtained by using only one block in the bit extraction process. In the latter case, each bit is detected independently first, and each is more vulnerable to channel noise. Once enough bits are in error, rendering an unrecognizable extracted image, no noise-reduction operation may recover a recognizable pattern. However, increasing the detection window may still extract a meaningful pattern, as shown in FIG. 7.

It should also be noted that the computation overhead for extracting multiresolution watermark images instead of a single watermark image is very small, because the same multiplication operations are shared and only a few additions are needed when the detection window size is increased. For video watermarking, the same binary watermark image may be embedded in a group of frames. Since the detection window now has one more dimension, the embedded watermark image is much more robust. However, a single frame is subject to the attack of trying to eliminate the watermarks by doing some sort of averaging from the neighboring frames. In other words, the capability of extracting the watermark image from a single test frame may be adversely affected. To overcome this problem, the same random sequence and the same kind of watermark image may be used for consecutive frames.

Starting with a visual-model-based watermark encoding scheme, and applying the detection scheme of the invention to extract the binary watermark image, the method of the invention will be described in relation to test results. The test image, shown in FIG. 3a, is 512×512 "baboon" and in FIG. 5a is a 512×512 "Lenna", and the watermark image is a 64×64 binary image shown in FIG. 2a, with each bit to be embedded into the corresponding 8×8 image block. In the visual-model-based watermark encoding scheme, the image is first divided into 8×8 blocks. Then each block is discrete cosine transformed (DCT). The Just Noticeable Distortion (JND) is then derived for each coefficient $I_i$ as Bi $C(I_i)$, where Bi is half of the optimized image-independent perceptually lossless quantization step size for each coefficient (or frequency), and $C(.)$, which is not less than 1, is an increasing function of $I_i$ which accounts for the contrast masking effect of human visual system. The feature set $\{I_i\}$ consists of the DCT or wavelet coefficients, excluding DC/lowest subband coefficient, which are larger than the corresponding JNDs, and $B_i C(I_i)$ is used as $G_i(.)$ in the watermark insertion process illustrated by Eq. (7). A meaningful signature $S_0$, for example "SLA", is mapped to an i.i.d. sequence $S_1$ with distribution of N(0, 1). $S_1$ is then modulated by the original watermark image and $G_i(.)$, and then embedded into the original image according to Eq. (3). In the watermark detector, the signature $S_0$ is presented as the secret key, and $S_{2i}$ is chosen as $B_i S_{1i}$, which has been shown to be a near optimal choice.

As mentioned above, the feature set $\{X_i\}$ consists of DCT/wavelet coefficients, excluding DC/lowest subband coefficient, which are larger than their corresponding $B_i$. For synchronization between encoder and decoder, we will use the same seed to generate a random sequence, each element of which corresponding to one coefficient. But only those elements corresponding to feature points will be used in the detection.

FIG. 3b depicts the watermarked "baboon" images. FIGS. 3a and 3b appear to be the same. No visual difference is observed. The visual model based watermark encoder is doing a good job. Different resolutions of the binary watermark image from the test image under different channel conditions are extracted and shown in FIG. 4. When the watermarked "baboon" image does not suffer from any signal processing, the extracted versions with different detection windows are shown in FIG. 4. Several detection window sizes are used in the extraction process.

In FIG. 4a, only the current image block is used. In FIG. 4b, five image blocks are used, including the current block, the ones above, below, to the left, and to the right. In FIG. 4c, a 3×3 window a of blocks are used, and in FIG. 4d, a 5×5 windows of blocks are used. It is seen that FIG. 4a and FIG. 4b provide the best resolution of the binary watermark image. There is some random noise presented in the extracted images. The noise is easily filtered out by human eye. It should be noted that if one increases the segment size for embedding one information bit in the encoding stage (in order to provide an identifier that is robust to signal processing), no such detailed information may be embedded and later extracted.

As the detection window size increases, lower resolution watermark images are extracted in which the edge parts become more and more jerky (see, e.g., the character "7" in FIG. 4d). Hence when the channel condition is good, the extracted good resolution watermark image of FIG. 4a or FIG. 4b may be presented to a jury to prove the ownership. Note that, since $S_2$ is generated independent of the test image, if the test image does not contain the claimed watermarks, the extracted binary image will look rather random, as shown in FIG. 2b. FIG. 6 shows the extracted watermark images from the watermarked 512×512 "Lenna"' image, sampled as in FIG. 4. These appear to be a little bit noisier than the corresponding results for "baboon"' image. This suggests that different images may tolerate different amount of watermarks, and therefore the detection scheme should have some adaptability to account for the differing robustness.

Figures 6A, 6B, 6C, 6D:
FIG. 6 depicts extracted watermark images from 512×512 watermarked "Lenna".
Figures 7A, 7B, 7C, 7D:
FIG. 7 depicts extracted watermark images from 512×512 watermarked "Baboon" with JPEG compression with quality factor of 15%.

When the watermarked image is subject to signal processing such as JPEG compression, the resolution of the extracted binary watermark image has to be traded for robustness. FIG. 7 shows the extracted watermark images with different detection windows from the watermarked "baboon" image which suffers from JPEG compression with quality factor of 15%. The extracted image in FIG. 6a is hardly recognizable. It is better to present to a jury the results of FIG. 7b or FIG. 7c in which both "PU" and "EE" are still recognizable.

Figures 8A, 8B, 8C, 8D:
FIG. 8 depicts extracted watermark images from 512×512 watermarked "Baboon" with JPEG compression with quality factor of 5%.

When the JPEG compression quality factor is 5%, the extracted image is meaningless, see FIG. 8a. The extracted watermark image in FIG. 8b is difficult to recognize too, while the extracted watermark images in FIG. 8c and FIG. 8d are recognizable (at least true for the larger characters "P" and "U"). Note that it might be helpful to construct binary watermark image in a way such that the content has some hierarchical structure, e.g., for identification of a hierarchical organization, or the IDs for contributors who make varying contributions to a composite image, and that higher level content consists of more redundant bits. It should also be noted that if the detection with quantitative measure method presented above is used to detect the watermark in the JPEG compressed watermarked "baboon" image (with quality factor of 5%), then the detector outputs a value of 21 which virtually corresponds to zero false alarm detection probability. Table 1 sets forth the false alarm detection probability with respect to the detector output value.

Figure 9:
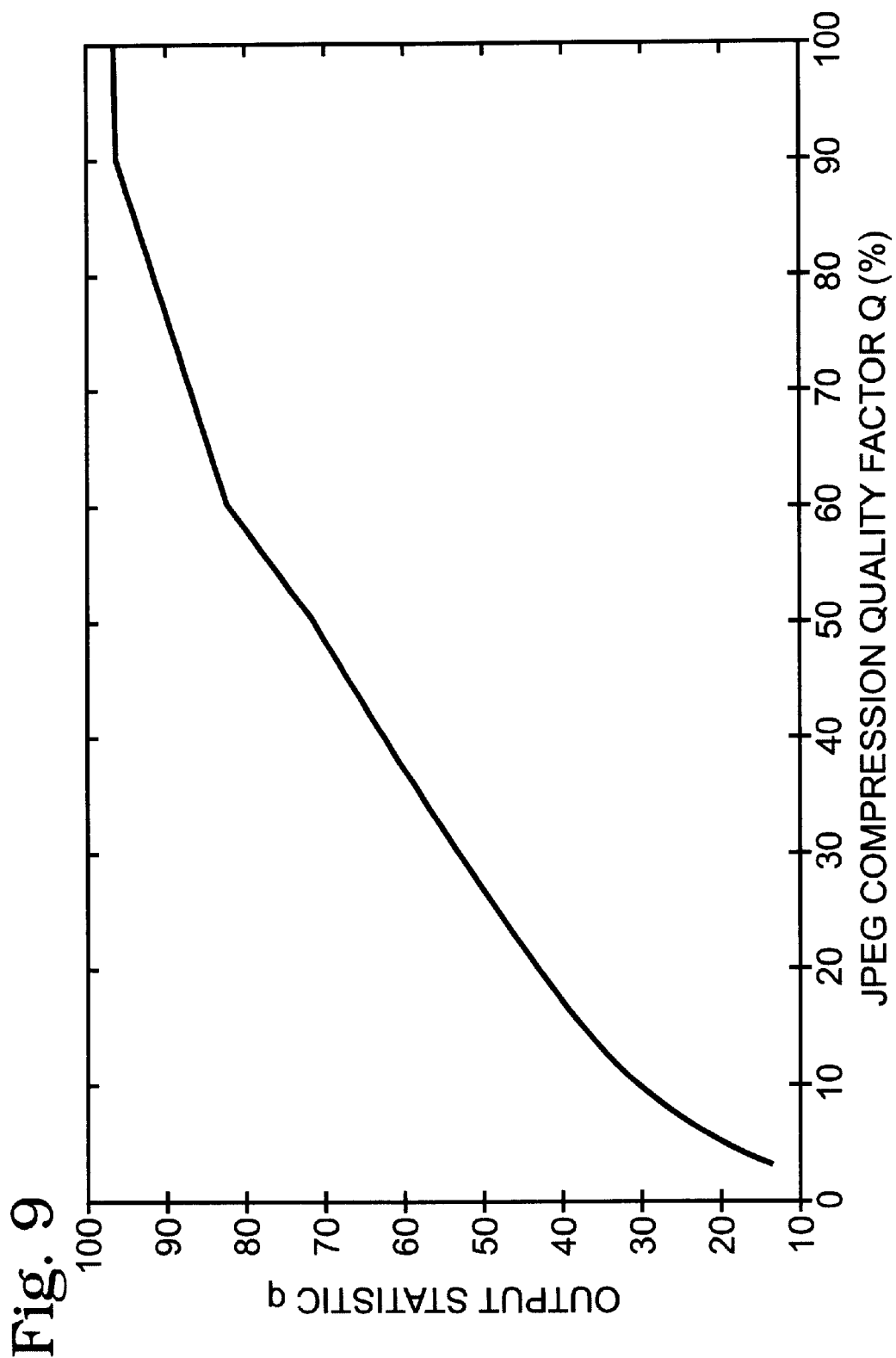
FIG. 9 is a graph showing output statistic q as a function of JPEG quality factor Q for 512×512 watermarked "Baboon".

FIG. 9 depicts the robustness of the detection with quantitative measure scheme presented above to JPEG compression. Note that in this case, the ownership claimant will present both the signature $S_0$ and the original logo image, and the correlating signature $\{S_{2i}\}$ should be $\{B_i S_{1i} b_i\}$ where $b_i$ is the corresponding bit (+1 or −1) of the original logo image. This is a valid correlating signature because it is still generated independent of any image.

It should be noted that there might be cases in which the extracted watermark images are hardly recognizable despite the detection window size used, while the detector output value of the detection with quantitative measure method presented above is still large enough to signify a low false alarm detection probability. This again suggests that the quantitative measure method presented above provides, in the view of technical experts, a fundamental measure for a valid ownership claim. However, the watermarking method of this invention makes more sense to ordinary people, thus will greatly facilitate the process of convincing a jury of an ownership claim. Only when the watermarked image has been subject to too much processing, resulting in unrecognizable extracted watermark images despite the detection window size used, should it be necessary to call the technical expert to testify the physical meaning of the output value of the detection with quantitative measure watermarking method described above.

The watermarking method presented has some potential applications in managing publicly available multimedia database. For example, it may be incorporated into a secure digital camera. It might also be in the interest of JPEG2000 (international standard for low bit rate still image coding) community.

Although a preferred embodiment of the invention, and variations thereof, have been disclosed, it will be appreciated that further modifications and variations thereto may be made within the scope of the invention as defined in the appended claims.

I claim:

1. A method for embedding and extracting visually imperceptible indicia in an image, comprising; embedding a visually imperceptible indicia in an original image;

generating a pseudo random sequence, including using a one-way deterministic function, to a single parameter and using the single parameter as a seed to generate an independent identical distribution pseudo random sequence;

testing a test image for an embedded visually imperceptible indicia; and extracting the visually imperceptible indicia from the test image to determine if the test image is a copy of the original image, wherein said embedding and said extracting include dividing an image into segments, and wherein said extracting includes making use of neighboring watermark bits to detect the current bit, for an image that has been subject to different levels of signal processing; and wherein said extracting further includes adaptively selecting a number of segments for watermark detection as a function of the level of signal processing.

2. The method of claim 1 wherein said embedding includes:

designating a visually imperceptible indicia to be embedded in an original image;

selecting a key $S_0$;

generating a pseudo random sequence $S_1$ from the key $S_0$;

modulating the visually imperceptible indicia by the pseudo random sequence to develop a signature; and inserting the signature into the original image.

3. The method of claim 2 wherein said generating includes mapping $S_0$, using a one-way deterministic function H, to a single parameter and using the single parameter as a seed to generate an independent identical distribution pseudo random sequence.

4. The method of claim 2 wherein said designating includes designating a one-bit visually imperceptible indicia and wherein said inserting includes implanting a single indicia in the original image.

5. The method of claim 2 wherein said designating includes designating multiple one-bit indicia and wherein said inserting includes dividing the original image into segments and placing a one-bit visually imperceptible indicia into each segment.

6. The method of claim 1 wherein said extracting includes demodulating an image feature set by a pseudo random sequence to determine the presence of the designated visually imperceptible indicia.

7. The method of claim 1 wherein said testing includes:

transforming a test image X into an image feature set $X_i$;

developing a random sequence $S_{1i}$ by subjecting a key $S_0$ to a one-way deterministic function H;

generating a correlating signature $S_{2i}$ from $S_{1i}$ and a perceptual model; and comparing the correlating output to a threshold value to determine the presence of a watermark.

8. The method of claim 1 wherein said embedding includes transforming the original image I into a transformed image $I_i$.

9. The method of claim 1 wherein said embedding a visually imperceptible image includes embedding a logo image $\{b_i\}$ and embedding a signature $S_0$.

10. The method of claim 1 wherein said extracting a visually imperceptible image includes extracting a logo image $\{b_i\}$ and extracting a signature $S_0$.

11. A method for embedding and extracting visually imperceptible indicia in an image, comprising:

embedding a visually imperceptible indicia in an original image, including designating a logo image to be embedded in an original image, wherein said designating includes designating multiple one-bit indicia;

selecting a signature $S_0$;

generating a pseudo random sequence $S_1$ from the signature $S_0$, including mapping $S_0$, using a one-way deterministic function H, to a single parameter and using the single parameter as a seed to generate an independent identical distribution pseudo random sequence;

modulating the logo image by the pseudo random sequence to develop a visually imperceptible indicia; and inserting the visually imperceptible indicia into the original image;

testing a test image for an embedded visually imperceptible indica; and extracting the visually imperceptible indicia from the test image to determine if the test image is a copy of the original image including placing a one-bit visually imperceptible indicia into each segment;

wherein said embedding and said extracting include dividing an image into segments and wherein said extracting includes making use of different number of segments associated with neighboring visually imperceptible indicia-bearing bits to detect the current bit, for an image that has been subject to different levels of signal processing, and wherein said extracting further includes adaptively selecting a number of segments for watermark detection as a function of the level of signal processing and of the need for robust detection and degree of resolution.

12. The method of claim 11 wherein said designating includes designating a one-bit visually imperceptible indicia and wherein said inserting includes implanting a single indicia in the original image.

13. The method of claim 11 wherein said extracting includes demodulating an image feature set by a pseudo random sequence to determine the presence of the designated visually imperceptible indicia.

14. The method of claim 11 wherein said testing includes:

transforming a test image X into an image feature set $X_i$;

developing a random sequence $S_{1i}$ by subjecting a signature $S_0$ to a one-way deterministic function H;

generating a correlating signature $S_{2i}$ from $S_{1i}$ and a perceptual model; and comparing the correlating output to a threshold value to determine the presence of a signature.

15. The method of claim 14 which includes comparing the correlating output to a threshold value to determine the presence of a watermark.

16. The method of claim 11 wherein said embedding includes transforming the original image I into a transformed image $I_i$.

17. A method for embedding and extracting visually imperceptible indicia in an image, comprising:

embedding a visually imperceptible indicia in an original image;

testing a test image for an embedded visually imperceptible indicia, wherein said testing includes transforming a test image X into an image feature set $X_i$;

developing a random sequence $S_{1i}$ by subjecting a key $S_0$ to a one-way deterministic function H;

generating a correlating signature $S_{2i}$ from $S_{1i}$ and a perceptual model; and comparing the correlating output to a threshold value to determine the presence of a watermark; and extracting the visually imperceptible indicia from the test image to determine if the test image is a copy of the original image;

wherein said embedding and said extracting include dividing an image into segments, and wherein said extracting includes making use of neighboring watermark bits to detect the current bit, for an image that has been subject to different levels of signal processing; and wherein said extracting further includes adaptively selecting a number of segments for watermark detection as a function of the level of signal processing and of the need for robust detection and degree of resolution, wherein a large number of segments are used to increase robustness and a smaller number of segments are used to increase resolution.

* * * * *